United States Patent [19]

Iinuma

[11] Patent Number: 4,533,957
[45] Date of Patent: Aug. 6, 1985

[54] METHOD OF PROCESSING PICTURE SIGNAL TO INCREASE AVERAGE RUN LENGTH AND APPARATUS THEREFOR

[75] Inventor: Kazumoto Iinuma, Tokyo, Japan

[73] Assignee: NEC Corporation, Tokyo, Japan

[21] Appl. No.: 526,588

[22] Filed: Aug. 26, 1983

[30] Foreign Application Priority Data

Aug. 26, 1982 [JP] Japan ................................ 57-148425

[51] Int. Cl.³ .......................... H04N 1/40; H04N 7/12
[52] U.S. Cl. ..................................... 358/261; 358/135;
358/283
[58] Field of Search ................ 358/133, 135, 136, 138,
358/260, 261, 283

[56] References Cited

U.S. PATENT DOCUMENTS

4,060,834 11/1977 Mounts et al. ........................ 358/261
4,086,620 4/1978 Bowen et al. ......................... 358/261
4,185,302 1/1980 Mounts et al. ........................ 358/261
4,185,303 1/1980 Mounts et al. ........................ 358/261
4,215,375 7/1980 Usubuchi et al. ..................... 358/261

Primary Examiner—Joseph A. Orsino, Jr.
Attorney, Agent, or Firm—Sughrue, Mikon, Zinn, Macpeak, and Seas

[57] ABSTRACT

A prediction error signal and a prediction state signal are generated for each of a plurality of picture elements (or bit planes or gray codes) to be encoded. The picture error signal is based on a plurality of previously encoded picture element data (or bit plane or gray code). The prediction state signal indicates the probability of the prediction error signal being accurate in one of two probability states. The prediction error signals are classified into two groups according to the probability state indicated by the corresponding prediction state signal. The prediction error signals are then reordered according to a predetermined algorithm. Thereafter, the reordered prediction error signals are run length coded based on the occurrences of incorrectly predicted error signals in the reordered list.

12 Claims, 15 Drawing Figures

METHOD OF PROCESSING PICTURE SIGNAL TO INCREASE AVERAGE RUN LENGTH AND APPARATUS THEREFOR

BACKGROUND OF THE INVENTION

1. Field of the invention

This invention relates to a method of coding a picture signal to increase average run length and apparatus therefor.

2. Description of the prior art

Run length coding viz., the coding of lengths of consecutive black and white picture elements is well known in the art of facsimile transmission for the purpose of transmission redundancy reduction. This technique allows for the compression of a two-level picture obtained by scanning a black and white drawing or document.

The Modified Huffman code and the two dimensional extension of the same, called the Modified READ code, are examples of international standards established for the purposes of increasing the utility of the above mentioned method.

However, even though run length coding has found extensive use in redundancy reduction in two-level facsimile digital transmissions, the same efficiency is not expected with the image processing of a half-tone picture. More specifically, a half-tone picture is reproduced, through dithering or screening, by controlling spatial density of black and white picture elements, and hence the number of runs increases due to reduced run lengths. Thus, the compression efficiency of picture data decreases to a considerable extent.

Furthermore, a picture with continuous gray level can not be run length coded using the internationally standardized algorithms of run length coding. Image signals of such a picture are usually coded by Differential PCM technique, for example.

SUMMARY OF THE INVENTION

It is therefore an object of this invention to provide a method of processing a picture signal to increase average run length and an apparatus therefor, wherein a picture signal is converted to a corresponding prediction error signal for effectively improving redundancy reduction.

It is another object of this invention to provide a method of processing a picture signal to increase average run length and an apparatus therefor, wherein the prediction error signals are classified into two groups (GOOD and BAD) according to the probability state of the corresponding prediction error signal in order to be processed by a standardized run length encoder.

It is yet another object of this invention to provide a method of processing a picture signal to increase average run length and an apparatus therefor, wherein the prediction error signals classified into two groups are read out alternatively from one or more memory until an incorrectly predicted signal is detected or read out in order to improve the efficiency of signal compression.

It is still another object of this invention to provide a method of processing a picture signal to increase average run length and an apparatus therefor, which are applicable not only to the processing of a two-level picture signal, but also to a half-tone picture signal as well as a multilevel gray picture signal.

It is still another object of this invention to provide a method of processing a picture signal to increase average run length and an apparatus therefor, which can be incorporated into international standards of facsimile system without substantial modification thereof.

The first aspect of the present invention takes the form of a method of processing a picture signal comprising the steps of: generating a prediction error signal for each of a plurality of picture elements (or, either bit planes or gray codes in the case of a multilevel gray picture signal) to be encoded, the prediction error signal being based on a plurality of previously encoded picture element (or, either bit plane or gray code) data and indicating correct and incorrect predictions; assigning one of first and second probability states to each of the prediction error signals; classifying the prediction error signals into two groups according to the probability state assigned thereto; storing the at least one group in a memory area in a manner that some of the prediction error signals are assigned the second probability state, the prediction error signals assigned the first probability state are stored in ascending chronological order and the prediction error signals assigned the second probability state are stored in descending chronological order; reordering the prediction error signals by (a) listing or reading out in ascending chronological order the classified prediction error signals until an incorrectly predicted error signal is detected, and (b) subsequently listing the classified prediction error signals in descending chronological order until a subsequent incorrectly predicted error signal is detected, and (c) repeating steps (a) and (b) until all of the prediction error signals are listed; and run length coding the prediction error signals based on the incorrectly predicted error signals in the list.

Another aspect of the present invention takes the form of a method of processing a picture signal comprising the steps of: generating a prediction error signal for each of a plurality of picture elements (or, either bit planes or gray codes where a multilevel picture signal is processed) to be encoded, the prediction error signal being based on a plurality of previously encoded picture element (or, either bit plane or gray code) data and indicating correct and incorrect predictions; assigning one of first and second probability states to each of the prediction error signals; classifying the prediction error signals into two groups according to the probabiltiy state assigned thereto; storing the two groups in two memory areas in a manner that the prediction error signals are arranged in chronological order; reordering the prediction error signals by (a) listing in chronological order the classified prediction error signals from one of the two memory areas until an incorrectly predicted error signal is detected, and (b) subsequently listing the classified prediction error signals in chronological order from the other memory area until a subsequent incorrectly predicted error signal is detected, and (c) repeating steps (a) and (b) until all of the prediction error signals are listed; and run length coding the prediction error signals based on the incorrectly predicted error signals in the list.

Yet another aspect of the present invention takes the form of an apparatus for processing a picture signal comprising: a predictor circuit for generating a prediction error signal for each of a plurality of picture elements to be encoded, the prediction error signal being based on a plurality of previously encoded picture element data and indicating correct and incorrect predictions, the predictor circuit further generating a prediction state signal which assigns one of first and second probability states to each of the prediction error signals; a reordering circuit including a memory means and coupled to the predictor circuit, the reordering circuit storing the prediction error signals in the memory means in a manner that the prediction error signals assigned the first probability state are stored in ascending chronological order and the prediction error signals assigned the second probability state are stored in descending chronological order, the reordering circuit reading the prediction error signals alternatively in ascending and descending chronological orders until an incorrectly predicted error signal is detected; and a run length encoder for encoding the prediction error signals alternatively based on the incorrectly predicted error signals.

BRIEF DESCRIPTION OF THE DRAWINGS

The features and advantages of the arrangement of the present invention will become more clearly appreciated from the following description taken in conjunction with the accompanying drawings in which.

DESCRIPTION OF THE PREFERRED EMBODIMENTS

Figure 1:
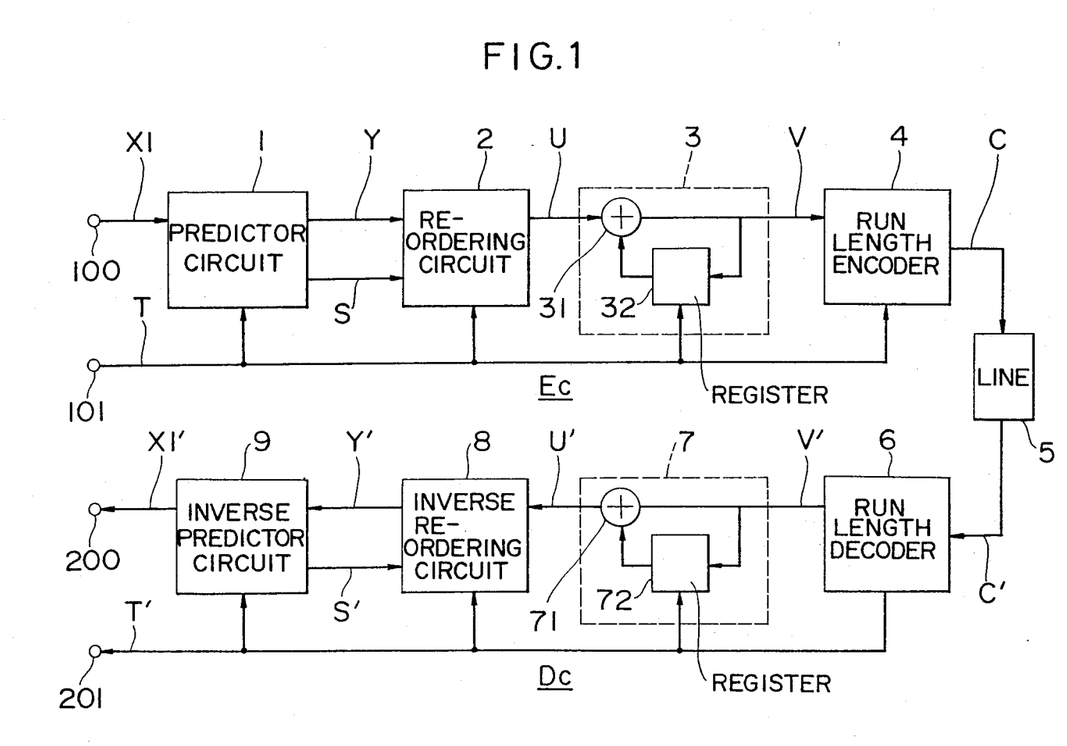
FIG. 1 is a block diagram showing an encoding/decoding circuit arrangement in which the various circuits characterizing the present invention may be incorporated.

FIG. 1 shows in block diagram form a circuit including an encoding unit Ec and a decoding unit Dc interconnected by a transmission line or a file memory denoted by the numeral 5. As shown, the encoding unit Ec includes a predictor circuit 1, a reordering circuit 2, a smoothing circuit 3 and a run length encoder 4. The decoding unit Dc includes a corresponding run length decoder 6, an inverse smoothing circuit 7, an inverse reordering circuit 8 and an inverse predictor circuit 9.

Figure 2:
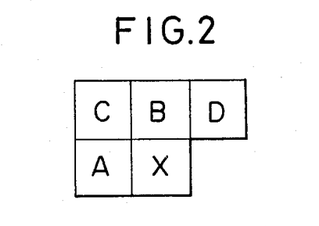
FIG. 2 is a diagram illustrating the position of a picture element "X" to which reference will be made when explaining the operation of the circuits characterizing the present invention.

FIG. 2 shows with respect to picture elements A, B, C and D, the position of the picture element X to which the prediction functions of the present invention will be directed.

Figure 3:
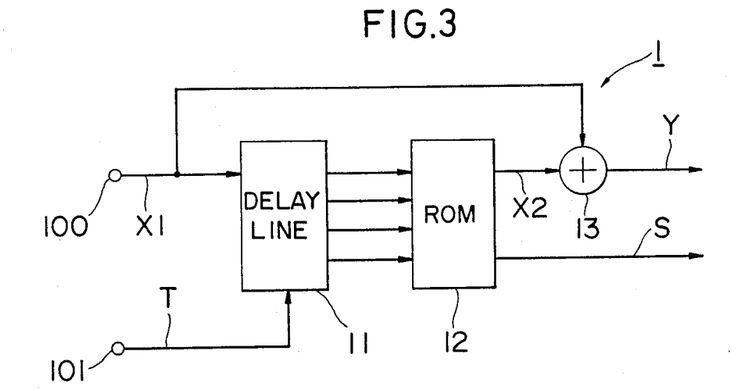
FIG. 3 is a block diagram showing in detail a predictor circuit forming part of an encoding unit of the FIG. 1 arrangement.

FIG. 3 shows in detail a predictor circuit such as indicated by reference numeral 1 in FIG. 1. As shown, this circuit receives at input terminal 100 a signal X1 representative of the output of a scanner which is scanning the picture element X shown in FIG. 2. This circuit includes a tapped delay line 11, a prediction ROM 12 and an Exclusive-OR gate 13. A timing pulse T is appplied via an input terminal 101 to the tapped delay line 11. The timing pulse T consists of a synchoronizing signal for picture signals and clock pulses. The tapped delay line 11 is arranged to output four reference signals which correspond to the already scanned picture elements A, B, C and D. These outputs are applied to the prediction ROM 12 which contains a table for comparing the inputs from the delay line 11 and via which a prediction signal X2 can be derived. The ROM 12 is arranged to output a second signal in the form of a prediction accuracy indicating signal (or a prediction state signal) S. With this arrangment, the prediction signal X2 assumes "0" when the probability of the prediction that the present picture element X is white (for example) exceeds 50%, and assumes "1" when less than 50%. The prediction accuracy indicating signal S is classified as GOOD (assigned "0" for example) when the above-mentioned probability is more than 94% (for example) and is classified as BAD (assigned "1") when not reaching this value. The prediction signal X2 and the picture signal X1 are fed to the exclusive-OR gate 13 which generates a prediction error signal Y. It is understood that if the prediction error signal Y assumes "0" the prediction is correct, and that if the signal Y assumes "1" the prediction is erroreous. Each of the prediction error signals Y is labelled either GOOD or BAD depending on the state of the signal S.

Figure 5:
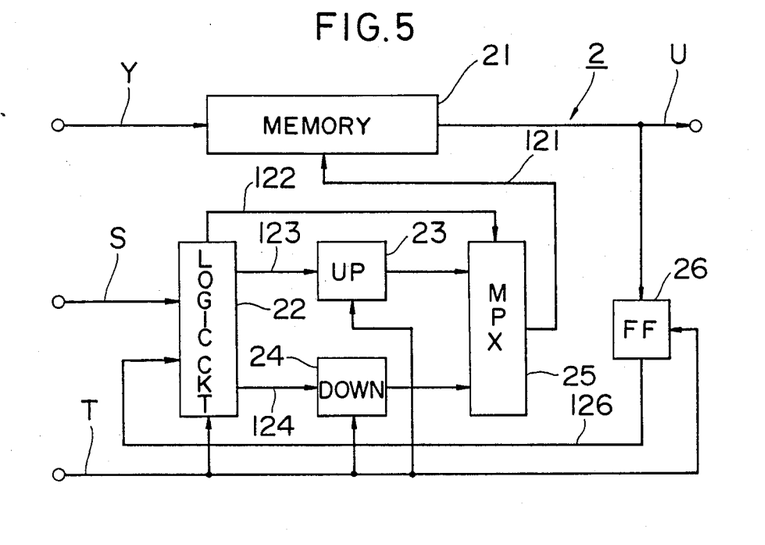
FIG. 5 is a block diagram showing in detail a reordering circuit forming part of the encoding unit utilized in the FIG. 1 arrangement.

Turning now to FIG. 5, there is shown an arrangement of the reordering circuit 2 which includes a memory 21, a logic circuit 22, an up-counter 23, a down-counter 24, a multiplexer 25 and a flip-flop (FF) 26, all of which are coupled as shown. The prediction accuracy indicating signal S from the ROM 12 (FIG. 3) is applied to the logic circuit 22.

The functions of the reordering circuit 2 of FIG. 5 will now be discussed in detail. This discussion will be made with reference to FIG. 7 and will be based on the assumption that one scanning line consists of only 10 picture elements for simplicity.

The reordering circuit 2 serves to reorder the prediction error signals Y when writing these signals into the memory 21 and also when reading out same. A sequence of Y1–Y10 labelled (A1) in FIG. 7 denotes the prediction error signals Y1–Y10 arranged in the order of occurrences (viz., chronological order). Each of the signals Y4, Y5 and Y9 are shown in hatched boxes indicating that the prediction regarding same was erroneous. That is to say assumed a value of "1". The remaining signals Y1–Y3, Y6–Y8 and Y10 are shown in unhatched boxes each indicating that the prediction is correct and hence assumed "0". A sequence of "G" and "B" labelled (A2) represents the signals S chronologically wherein "G" and "B" depict GOOD and BAD states respectively. The order of the prediction accuracy indicating signals S (A2) corresponds to the order of the prediction error signals Y of (A1), arranged thereabove. The up-counter 23 and the down-counter 24 are respectively set to their initial states of 1 and 10 at the beginning of each new scanning line in response to the timing signal T. The logic circuit 22 receives the signal S and applies a count pulse to the up-counter 23 via a line 123 when the signal S assumes "0" (GOOD), and, on the other hand, applies a count pulse to the down-counter 24 via a line 124 when the signal S assumes "1" (BAD). The counters 23 counts up in response to the count pulse applied and outputs an address signal. Similarly, the counter 24 counts down in response to the count pulse applied and outputs an address signal. The logic circuit 22 relays the prediction state signal S to the multiplexer 25 which selectively couples the counters 23 and 24 to the address input of the memory 21 depending on the logic state of the signal S: the memory 21 is coupled to the counter 23 when the signal S assumes "0" and is coupled to the counter 24 when assuming "1". Thus, the prediction error signal Yi (i=1 ... 10) is put in the unfilled memory cell of the smallest index if the corresponding prediction state signal S is GOOD, and is put in the unfilled memory cell of the largest index if the signal S is BAD. Therefore, the signals Y1–Y10 are arranged in the memory cells addressed 1 ... 10 in the order of Y1, Y2, Y4, Y6, Y7, Y8, Y9, Y10, Y5 and Y3, the manner of which is shown in (A3) of FIG. 7. When all the signals Y1–Y10 (i.e. one scanning line data) are written into the memory 21, then the stored data is read out as a signal U before the data of the next line reaches the memory 21. The data Y1–Y10 in the memory 21 is first read out in ascending chronological order from the smallest index or address until an incorrectly predicted signal is read out, thereafter it is read out in descending order from the largest index or address also until an incorrectly predicted signal is read out; subsequently it is again read out in ascending order from the remaining smallest index until an incorrectly predicted signal is read out. This procedure is repeated until all of the signals Y1–Y10 are read out. The reading order according to this algorithm is shown in (A4) of FIG. 7. In the above mentioned reading operation, the flip-flop 26 reverses its output in response to the logic state "1" of the signal U and serves to switch the counters 23, 24 and the multiplexer 25 through a line 126 and the logic circuit 22.

In the above description, if the next signal Y (i.e. the next scanning line data) is successively outputted from the prediction circuit 1, then a second reordering circuit may be provided so as to alternately process the outputs of the circuit 1.

The signal U from the memory 21 is applied to a smoothing or arranging circuit 3 which comprises an exclusive-OR gate 31 and a register 32. The output V of the smoothing circuit 3 is shown in (A5) of FIG. 7. The smoothing circuit 3 reverses the logic state of its output (i.e. from "0" (white) to "1" (black), or vice versa) every reception of an incorrectly predicted signal. The signal V is then run length encoded in a run length encoder 4 which outputs a run length encoded signal C. The run lengths of the signal C in this embodiment are schematically shown in (A6) of FIG. 7, in which there are four runs consisting of a white run length of two codes (W2), a black run length of two codes (B2), a white run length of four codes (W4) and black run length of two codes (B2) in this order. This run length encoder 4 may take the form of an international standard of MH (Modified huffmann) encoder.

For better understanding of the efficiency of the smoothing, if the codes of the signal U are run length encoded without the smoothing, then the number of runs increases to 7: W2, B1, W1, B1, W3, B1 and W1, where "W" and "B" represent white and black run lengths respectively and where the following numbers each denotes the number of codes. It is therefore understood that the smoothing process allows the number of runs to be reduced considerably, or in other words, allows the average run length to be increased effectively.

The reordering and the smoothing allow the probability to increase that prediction error signals grouped in GOOD and BAD are run length coded "white" and "black" respectively.

Figure 7:
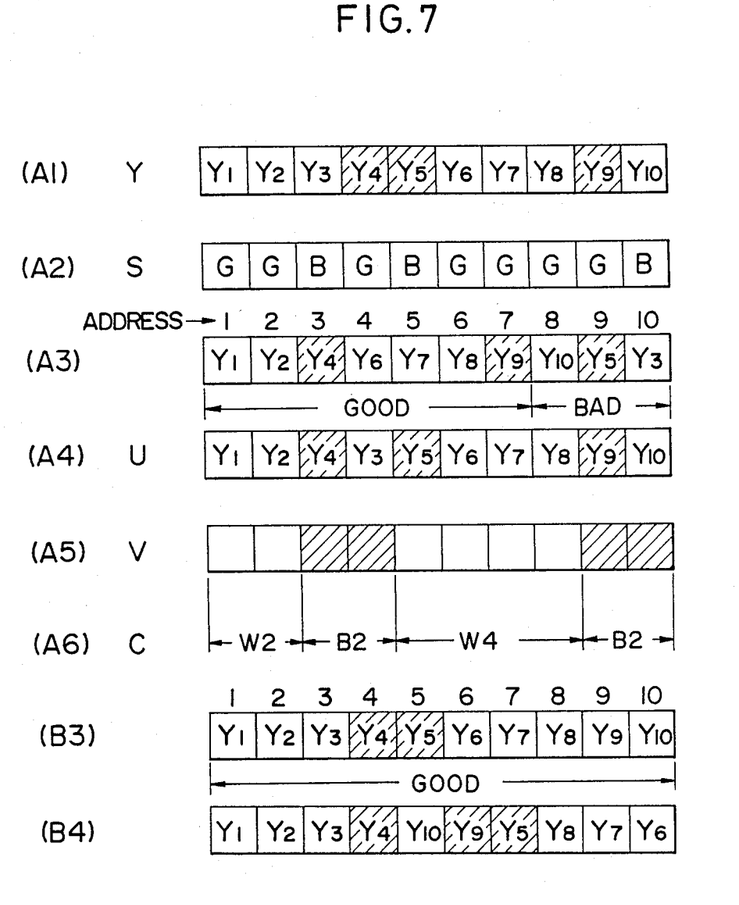
FIG. 7 are tables illustrating the processes carried out in the circuit blocks 1, 2 and 3 shown in FIG. 1.

Turning now to (B3) of FIG. 7, the situation wherein all the signals Y1–Y10 are classified as GOOD is shown. The signals Y1–Y10 are read out from the memory 21 according to the same algorithm as previously described: first in the ascending order of memory address until an incorrectly predicted signal is read out and thereafter in the descending order also until an incorrectly predicted signal is read out, and then again in the ascending order. This process is continued until the completion of the read-out.

In the above discussion of this invention, the prediction error signals Y1–Y10 have been stored in one memory region in ascending and descending address orders depending on the corresponding prediction states GOOD and BAD. Alternatively, the signal Y can selectively be stored in two memory devices (or different two memory areas of same memory device) according to the two prediction states GOOD and BAD. In this case, the signal Y is read out alternately from two different memory devices every occurrence of an incorrectly predicted signal.

The compressed picture signal C is then transmitted, via the transmission line or the file memory 5, to the run length decoder 6 as a signal C'. The decoder 6 serves to decode the signal C' and outputs a decoded signal V' as well as a timing signal T'. The timing signal T' is applied to a register 72 of the inverse smoothing circuit 7, the inverse reordering circuit 8 and the inverse predictor circuit 9.

The decoded signal V' is fed to the inverse smoothing circuit 7 which includes an Exclusive-OR gate 71 in addition to the aforementioned register 72. The Exclusive-OR gate 71 outputs a signal U' which includes logic levels "1" each indicating a change between White and Black codes. The logic level "1" corresponds to the incorrectly predicted signal as previously described.

Figure 6:
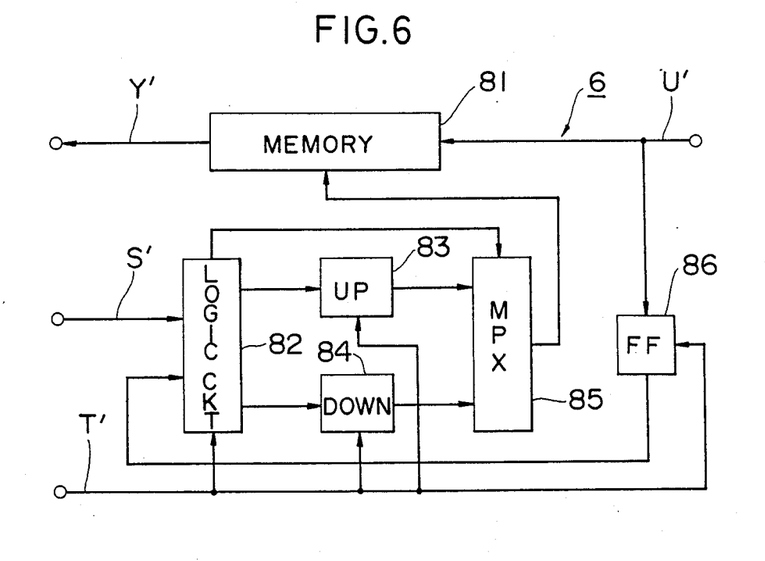
FIG. 6 is a block diagram showing in detail an inverse reordering circuit forming part of the decoding unit included in the FIG. 1 arrangement.

FIG. 6 is a block diagram showing the inverse reordering circuit 6 which corresponds to the reordering circuit 2 of FIG. 5 and which includes a corresponding memory 81, a logic circuit 82, an up-counter 83, a down-counter 84, a mulitiplexer 85 and flip-flop (FF) 86, all of which are coupled as shown. The signal U' is written into the memory 81 under the control of the flip-flop 86 which reverses its output in response to "1" of the signal U', while the signal U' is read out from the memory 81 using a prediction accuracy indicating signal S' applied from the inverse predictor circuit 9 of FIG. 4. The operation of the arrangement of FIG. 6 is similar to that of FIG. 5, so that further detailed discussion will be omitted for simplicity.

Figure 4:
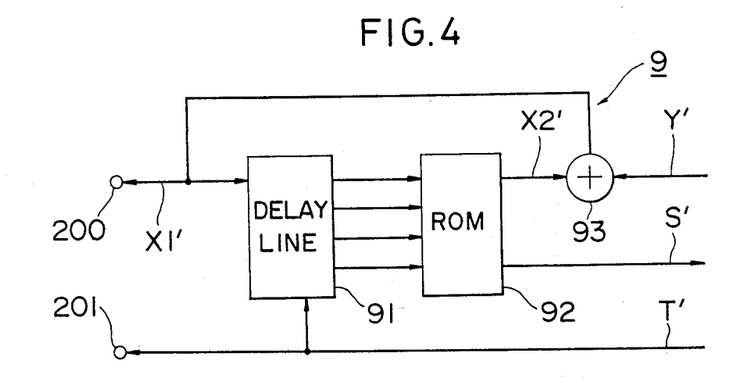
FIG. 4 is a block diagram showing in detail an inverse predictor circuit forming part of a decoding unit of the FIG. 1 arrangement.

FIG. 4 is a block diagram showing the inverse predictor circuit 9 which corresponds to the predictor circuit 1 of FIG. 3 and which includes a corresponding tapped delay line 91, a predictor ROM 92 and an Exclusive-OR gate 93, all of which function in the same manner as the counterpart blocks of FIG. 3. The tapped delay line 91 is initialized, at the beginning of a scanning line, by the timing signal T' from the run length decoder 6 (FIG. 1), and outputs the prediction signal X2' and the prediction accuracy indicating signal S'. The signal X2' equals the signal X2. The signal S' is fed to the logic circuit 82 of FIG. 6 for controlling the reading of the stored data as described previously. If the prediction error signal Y' from the memory 81 (FIG. 6) is correctly decoded, then the signal Y' equals the signal Y and hence the output of the Exclusive-OR gate 93 (viz., a signal X1') equals the signal X1. Thus, the picture signal X1 is reproduced. The decoded picture signal X1' is applied to an output terminal 200. The timing signal T' is applied to an external circuit (not shown) through an output terminal 201.

Figure 8:
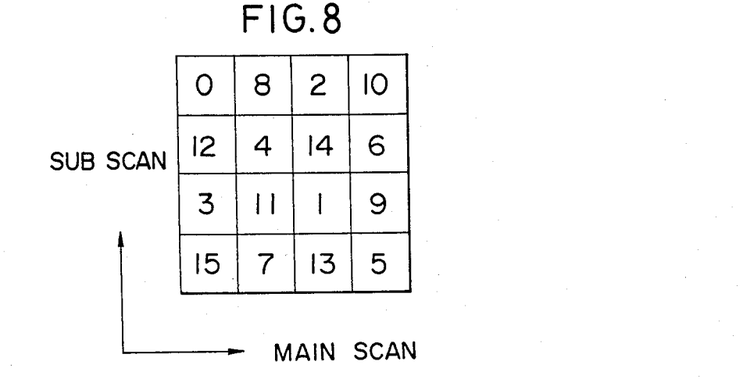
FIG. 8 is a diagram showing a dither matrix for use in processing a half tone image signal.
Figure 9:
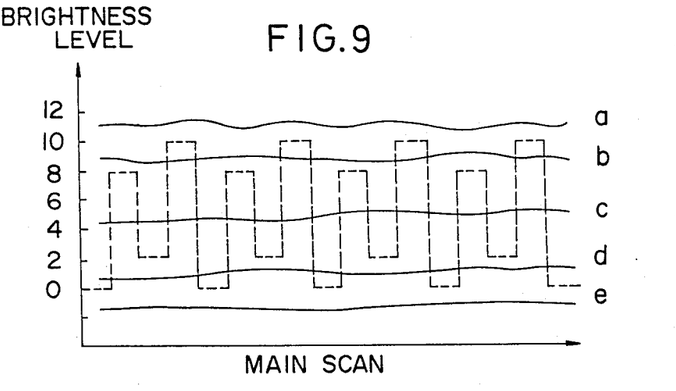
FIG. 9 is a graph showing in terms of brightness degree, five half-tone levels "a" to "e" which are compared with threshold levels.
Figure 10:
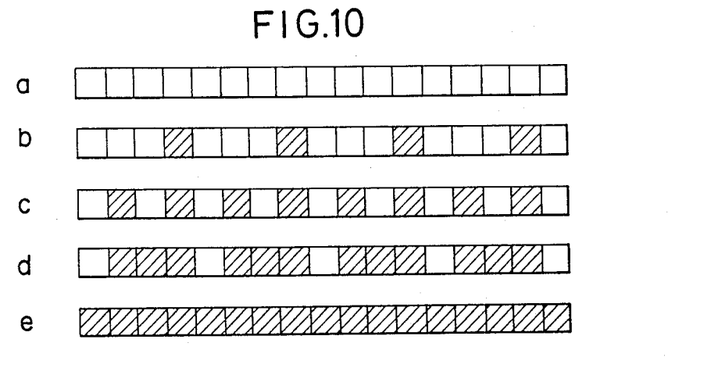
FIG. 10 is a chart showing in digitized form the five half tone levels "a" to "e" shown in FIG. 9.

Reference is now made to FIGS. 8 through 13, wherein there is shown an arrangement via which a half-tone signal can be encoded and then decoded. A recorded half-tone copy gives the illusion of a multilevel picture by appropriately controlling the spatical density of black and white picture elements. Such a half-tone copy is obtained through an image processing technique such as dithering or screening as is well known in the art. Prior to the discussion of this arrangement, an ordered dither technique will be described with reference to FIGS. 8 through 10. The dithering consists of comparing a multilevel image with a position dependent threshold and turning only those picture elements "1" where the input signal exceeds the threshold value. FIG. 8 shows a dither matrix of size 4×4 in which each number denotes a threshold value. The dither matrix is periodically repeated, with periods of four in both of the directions of the main and sub-scanning lines, over the entire picture to provide the threshold pattern for the whole image. A further detailed description of the dither matrix of FIG. 8 will be omitted for avoiding redundancy in that it is apparent to those skilled in the art. FIG. 9 shows five half-tone levels "a" through "e" which are compared with a threshold level (shown in a broken line). This threshold level corresponds to the levels of the first line of the matrix shown in FIG. 8. Results of the comparisons in FIG. 9 are shown in FIG. 10 in which the half-tone levels "a" through "e" are converted into two-level signals denoted by white and hatched blocks.

As seen from FIG. 10, the binary signals of the half-tone levels, except for the special cases of "a" and "e", consists of the white and black runs each having a very short run length. This means that if such a half-tone binary signal is run length coded, compression efficiency can not be expected.

Figure 11:
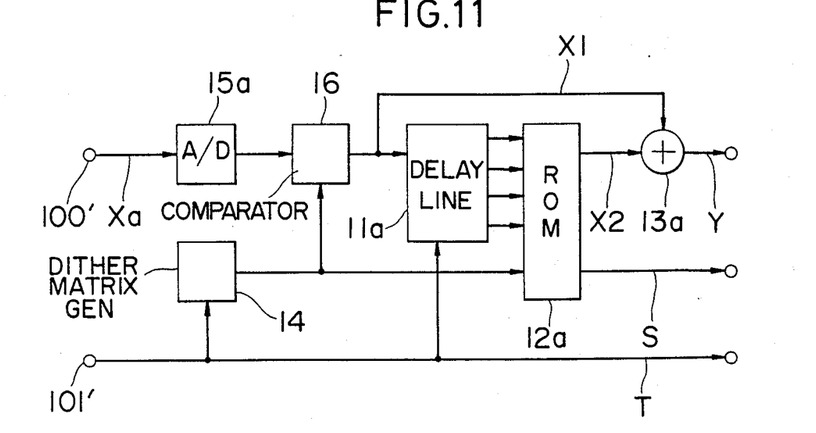
FIGS. 11 and 12 are block diagrams showing predictor and inverse predictor circuits respectively for use in the arrangement shown in FIG. 1.
Figure 12:
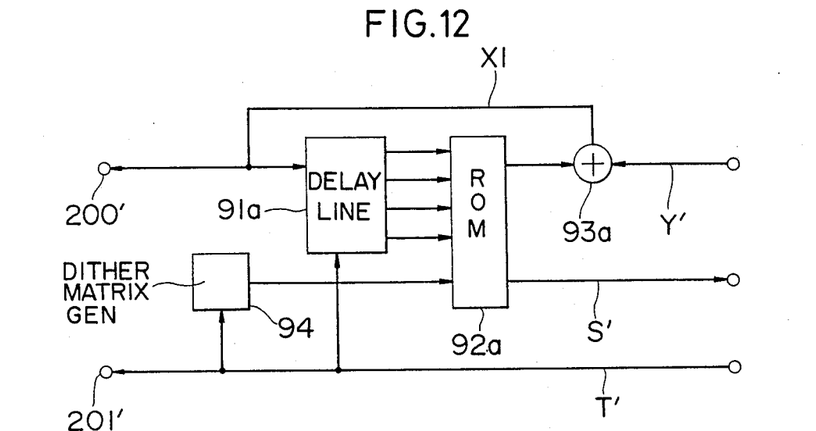
Figure 13:
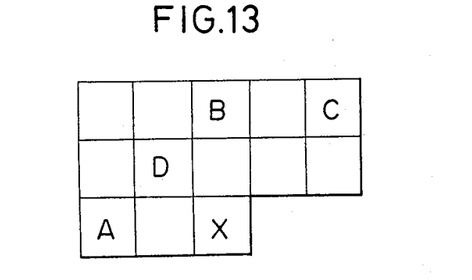
FIG. 13 is a diagram similar to FIG. 2 but showing the picture elements A, B, C and D of locations further displaced from the picture element X which is subject to prediction.

The arrangements as shown in FIGS. 11 and 12 are directed to improve the compression efficiency in run length coding of a dithered picture signal.

FIG. 11 is a block diagram showing a predictor circuit for use in encoding a half-tone picture signal, which circuit comprises a dither threshold level generator 14, an analog-digital (A/D) converter 15, a comparator 16, a tapped delay line 11a, a predictor ROM 12a and an Exclusive-OR gate 13a, all of which are coupled as shown.

A half-tone analog signal Xa of a given picture element X is applied, via an input terminal 100', to the A/D converter 15 which converts the analog signal to a corresponding digital signal. The digital signal is compared with the dither threshold levels from the generator 14 at the comparator 16 which applies its output to the tapped delay line 11a. The delay line 11a, the ROM 12a and the Exclusive-OR gate 13a, function substantially in the same manner as the counterparts of FIG. 3. One of the differences between the processes in the arrangements of FIGS. 3 and 11 is that the ROM 12a receives information of threshold levels (16 values as shown in FIG. 8), and the other difference is that in FIG. 11 the picture elements utilized in predicting the characteristics of the picture element X are relatively displaced (FIG. 13) as compared with the arrangement shown in FIG. 3. It should be noted that this increase in displacement increases the accuracy of the prediction function. In this case, the tapped delay line 11a requires a memory for storing two scanning line data. Furthermore, the accuracy of the prediction is further increased, if the tapped delay line 11a is arranged to add the data of the two previously encoded picture elements which have been compared with the same threshold level as the picture element X (i.e. one is in the fourth previous line relative to the line containing the picture element X and and the other is the fourth previous picture element before X).

The signal Y from the Exclusive-OR gate 13a is thereafter reordered, smoothed and run length encoded by the same arrangements as previously discussed (i.e. blocks 2, 3 and 4 in FIG. 1). The run length encoded signal is then inversely processed in the same manner as described previously and applied to an Exclusive-OR gate 93a of FIG. 12 as a signal Y'. FIG. 12 is a block diagram showing an inverse predictor circuit which includes a corresponding tapped delay line 91a, a prediction ROM 92a, an Exclusive-OR gate 93a and a dither matrix generator 94 and which is used to decode the signal Y'. The circuit function of the FIG. 12 arrangement is substantially the same as that of FIG. 11, so that further description thereof will be omitted. It should be noted that the arrangements of FIGS. 11 and 12 can be utilized for encoding and decoding a screened picture signal.

Figure 14:
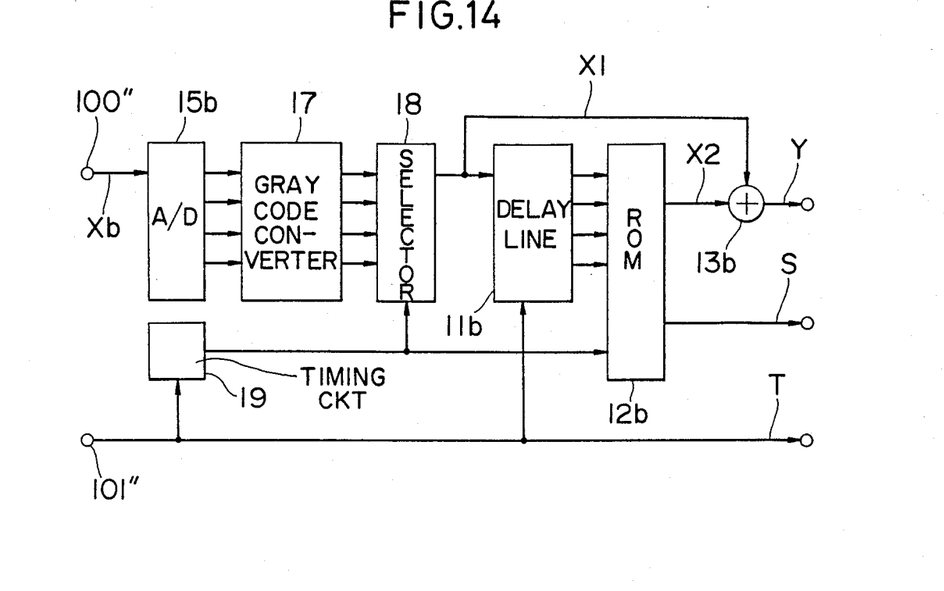
FIGS. 14 and 15 are block diagrams showing another predictor and inverse predictor circuit arrangement for use in the arrangement shown in FIG. 1.

FIG. 14 is a block diagram showing a predictor circuit for use in encoding a multilevel gray picture signal, which circuit comprises an analog-digital (A/D) converter 15', a gray code converter 17, a selector 18, a timing pulse generator 19, a tapped delay line 11b, a prediction ROM 12b and an Exclusive-OR gate 13b, all of which are coupled as shown. The last three blocks, viz., the delay line 11b, the ROM 12b and the Exclusive-OR gate 13b, function in essentially the same manner as the counterparts of FIG. 3. An analog half-tone signal Xb is applied, via an input terminal 100'', to the A/D converter 15' which converts the analog signal to a corresponding digital signal. If the analog signal is converted to a corresponding digital signal of 16 binary levels, then the A/D converter 15' supplies the gray code converter 17 with a 4-bit binary code for each multilevel gray image signal. The converter 17 converts the binary picture codes to corresponding gray codes with reference to the following conversion table (for example) which is shown in part for simplicity:

|  | BINARY CODE | GRAY CODE |
|---|---|---|
| (bit plane) | 0000 | 0000 |
|  | 0001 | 0001 |
|  | . | . |
|  | . | . |
|  | . | . |
|  | 1110 | 1001 |
|  | 1111 | 1000 |

The conversion of the binary picture signal to the corresponding gray code increases the efficiency of signal compression.

The gray codes of one scanning line are stored in the memory of the selector 18 as a group or unit and thereafter are applied to the tapped delay line 11b one by one. The predictor unit, including the delay line 11b, the ROM 12b and the Exclusive-OR gate 13b, produces the prediction error signal Y as well as the prediction accuracy indicating signal S in substantially the same manner as described previously. The timing circuit 19 supplies the selector 18 and the ROM 12b with a signal for discriminating each bit plane. The reference picture elements for predicting a given picture element may be the four elements shown in FIG. 2, but further prediction accuracy is expected when predicting the picture element to be encoded based on every bit plane.

Figure 15:
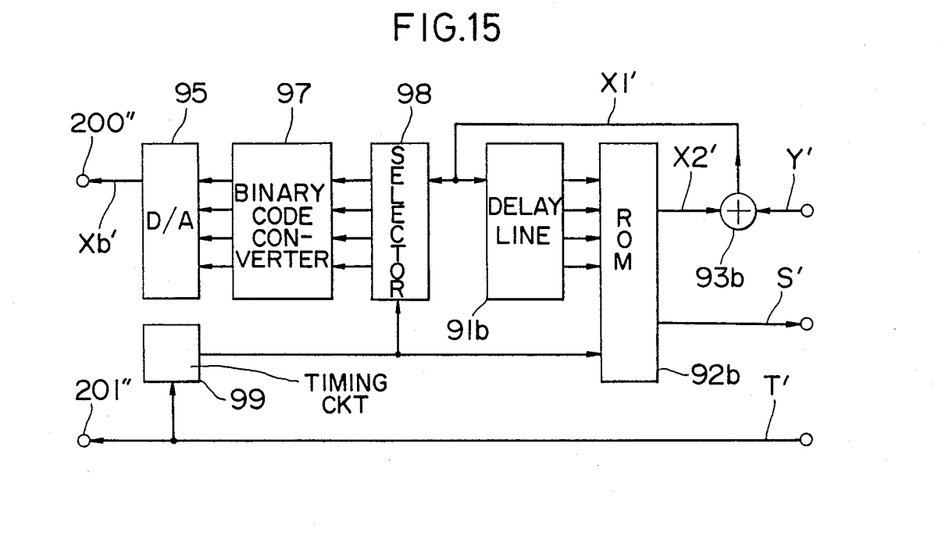

The prediction error signal Y from the Exclusive-OR gate 13b of FIG. 14 is thereafter reordered, smoothed and run length encoded by the same arrangemnts as previously discussed (i.e. blocks 2, 3 and 4 in FIG. 1). The run length encoded signal is then inversely processed in the same manner as described previously and applied to an Exclusive-OR gate 93b of FIG. 15 as a signal Y'. FIG. 15 is a block diagram showing an inverse predictor circuit which includes a corresponding tapped delay line 91b, a prediction ROM 92b, an Exclusive-OR gate 93b and a digital-analog (D/A) converter 95, a binary code converter 97, a selector 98 (which includes a memory), and a timing circuit 99, as shown. The circuit function of the FIG. 15 arrangement is substantially the same as that of FIG. 14, so that further description thereof will be omitted.

The foregoing description shows only preferred embodiments of the present invention. Various modifications are apparent to those skilled, in the art without departing from the scope of the present invention which is only limited by the appended claims.

What is claimed is:

1. A method of processing a picture signal comprising the steps of:
generating a prediction error signal for each of a plurality of picture elements to be encoded, said prediction error signal being based on a plurality of previously encoded picture element data and indicating correct and incorrect predictions;
assigning one of first and second probability states to each of said prediction error signals;
classifying the prediction error signals into two groups according to the probability state assigned thereto;
storing said two groups in a memory area in a manner that said prediction error signals assigned said first probability state are stored in ascending chronological order and said prediction error signals assigned said second probability state are stored in descending chronological order;
reordering the prediction error signals by
(a) listing in ascending chronological order the classified prediction error signals until an incorrectly predicted error signal is detected, and
(b) subsequently listing in ascending order said classified prediction error signals in descending chronological order until a subsequent incorrectly predicted error signal is detected, and
(c) repeating steps (a) and (b) until all of the prediction error signals are listed; and
run length coding said prediction error signals based on the incorrectly predicted error signals in the list.

2. A method as claimed in claim 1, further comprising the following step before said run length coding:
changing the state of the prediction error signal every detection of the incorrectly predicted error signal.

3. A method of processing a picture signal comprising the steps of:
generating a prediction error signal for each of a plurality of picture elements to be encoded, said prediction error signal being based on a plurality of previously encoded picture element data and indicating correct and incorrect predictions;
assigning one of first and second probability states to each of said prediction error signals;
classifying the prediction error signals into two groups according to the probability state assigned thereto;
storing said two groups in two memory areas in a manner that said prediction error signals are arranged in chronological order;
reordering the prediction error signals by
(a) listing in chronological order the classified prediction error signals from one of said two memory areas until an incorrectly predicted error signal is detected, and
(b) subsequently listing said classified prediction error signals in chronological order from the other memory area until a subsequent incorrectly predicted error signal is detected, and
(c) repeating steps (a) and (b) until all of the prediction error signals are listed; and
run length coding said prediction error signals based on the incorrectly predicted error signals in the list.

4. A method as claimed in claim 3, further comprising the following step before said run length coding:
changing the state of the prediction error signal every detection of the incorrectly predicted error signal.

5. A method of processing a picture signal comprising the steps of:
generating a prediction error signal for each of a plurality of bit planes to be encoded, said prediction error signal being based on a plurality of previously encoded bit plane data and indicating correct and incorrect predictions;
assigning one of first and second probability states to each of said prediction error signals;
classifying the prediction error signals into two groups according to the probability state assigned thereto;
storing said two groups in a memory area in a manner that said prediction error signals assigned said first probability state are stored in ascending chronological order and said prediction error signals assigned said second probability state are stored in descending chronological order;
reordering the prediction error signals by
(a) listing in ascending chronological order the classified prediction error signals until an incorrectly predicted error signal is detected, and (b) subsequently listing in ascending order said classified prediction error signals stored in descending chronological order until a subsequent incorrectly predicted error signal is detected, and (c) repeating steps (a) and (b) until all of the prediction error signals are listed; and run length coding said prediction error signals based on the incorrectly predicted error signals in the list.

6. A method as claimed in claim 5, further comprising the following step before said run length coding:

changing the state of the prediction error signal every detection of the incorrectly predicted error signal.

7. A method of processing a picture signal comprising the steps of:

generating a prediction error signal, for each of a plurality of bit planes to be encoded, said prediction error signal being based on a plurality of previously encoded bit plane data and indicating correct and incorrect predictions;

assigning one of first and second probability states to each of said prediction error signals;

classifying the prediction error signals into two groups according to the probability state assigned thereto;

storing said two groups in two memory areas in a manner that said prediction error signals are arranged in chronological order;

reordering the prediction error signals by (a) listing in chronological order the classified prediction error signals from one of said two memory areas until an incorrectly predicted error signal is detected, and (b) subsequently listing said classified prediction error signals in chronological order from the other memory area until a subsequent incorrectly predicted error signal is detected, and (c) repeating steps (a) and (b) until all of the prediction error signals are listed; and run length coding said prediction error signals based on the incorrectly predicted error signals in the list.

8. A method as claimed in claim 7, further comprising the following step before said run length coding:

changing the state of the prediction error signal every detection of the incorrectly predicted error signal.

9. An apparatus for processing a picture signal comprising:

a predictor circuit for generating a prediction error signal for each of a plurality of picture elements to be encoded, said prediction error signal being based on a plurality of previously encoded picture element data and indicating correct and incorrect predictions, said predictor circuit further generating a prediction state signal which assigns one of first and second probability states to each of said prediction error signals;

a reordering circuit including a memory means and coupled to said predictor circuit, said reordering circuit storing said prediction error signals in said memory means in a manner that said prediction error signals assigned said first probability state are stored in ascending chronological order and said prediction error signals assigned said second probability state are stored in descending chronological order, said reordering circuit reading said prediction error signals alternatively in ascending and descending chronological orders until an incorrectly predicted error signal is detected; and a run length encoder for encoding said prediction error signals alternatively based on the incorrectly predicted error signals.

10. An apparatus as claimed in claim 9, further comprising a smoothing circuit for changing the state of the prediction error signal every detection of the incorrectly predicted error signal.

11. An apparatus as claimed in claim 9, wherein said predictor circuit includes:

a tapped delay line which receives said picture signal for each of said picture elements and which generates said plurality of previously encoded picture element data;

a predictor ROM coupled to said tapped delay line and outputting said prediction state signal and a prediction signal; and an Exclusive-OR gate for receiving said picture signal and said prediction signal and for generating said prediction error signal.

12. An apparatus as claimed in claim 11, wherein said reordering circuit further includes:

a logic circuit which receives said prediction state signal for selectively outputting a first and second count pulses in response thereto;

an up-counter coupled to said logic circuit and counting up in response to said first count pulse;

a down-counter coupled to said logic circuit and counting down in response to said second count pulse;

a multiplexer coupled to said logic circuit and to said up-counter and down-counter, and connecting an address input terminal of said memory means to either said up-counter or said down-counter in response to said prediction state signal which is relayed via said logic circuit; and a flip-flop receiving the output of said memory means for controlling said up-counter and down-counter when reading out data from said memory means.

* * * * *